United States Patent [19]

Dyer

[11] 4,330,871

[45] May 18, 1982

[54] DETECTING SUBTERRANEAN HYDROCARBON ACCUMULATIONS

[76] Inventor: Robert K. Dyer, P.O. Box 533, Ada, Okla. 74820

[21] Appl. No.: 198,463

[22] Filed: Oct. 20, 1980

[51] Int. Cl.³ .......................... G01V 1/13; G01V 1/104
[52] U.S. Cl. ......................................... 367/14; 367/27; 181/118; 102/705
[58] Field of Search ................ 102/205, 705; 367/145, 367/14, 27; 181/106, 118, 117; 166/250, 254; 175/40, 50

[56] References Cited

U.S. PATENT DOCUMENTS

| | | | |
|---|---|---|---|
| 1,500,243 | 7/1924 | Hammond | 181/118 |
| 2,353,484 | 7/1944 | Merten et al. | 181/117 |
| 2,803,305 | 8/1957 | Behning et al. | 367/37 |
| 3,752,256 | 8/1973 | Mollere | 181/117 |
| 3,815,501 | 6/1974 | Anderson et al. | 102/705 |
| 3,952,832 | 4/1976 | Elmore et al. | 367/145 |
| 4,026,382 | 5/1977 | Field et al. | 181/117 |
| 4,057,780 | 11/1977 | Shuck | 181/106 |
| 4,282,587 | 8/1981 | Silverman | 367/14 |

FOREIGN PATENT DOCUMENTS

| | | | |
|---|---|---|---|
| 269502 | 4/1970 | U.S.S.R. | 181/117 |
| 623167 | 8/1978 | U.S.S.R. | 181/118 |

*Primary Examiner*—Nelson Moskowitz
*Attorney, Agent, or Firm*—Laney, Dougherty, Hessin & Beavers

[57] ABSTRACT

Methods of detecting the presence and extent of hydrocarbon accumulations in subterranean formations are provided comprising introducing a first gas into the formation having the property of being substantially unreactive with the formation and with water contained therein but forming a combustible mixture with hydrocarbons and introducing a second gas into the formation having the property of being substantially unreactive with the formation and water but being explosively reactive with the first gas when mixed therewith in the presence of hydrocarbons. The second gas is mixed with the first gas in the formation and when in the presence of hydrocarbons the mixture explodes thereby generating seismic waves which travel through the earth to the surface thereof. The seismic waves are detected on the surface to thereby determine the presence and extent of the hydrocarbon accumulations in the subterranean formation.

6 Claims, 5 Drawing Figures

DETECTING SUBTERRANEAN HYDROCARBON ACCUMULATIONS

BACKGROUND OF THE INVENTION

1. Field of the Invention

The present invention relates generally to detecting subterranean hydrocarbon accumulations, and more particularly, but not by way of limitation, to detecting such accumulations by introducing gases therein which explode in the presence of hydrocarbons.

2. Description of the Prior Art

Seismic geophysical exploration has been practiced for many years to determine the configuration of subterranean formations and the possible favorable structural or stratigraphic traps for the accumulation of hydrocarbons. Such processes generally involve the detonation of explosives on the earth's surface or forcibly contacting the earth's surface with a reciprocating mass whereby seismic waves are generated which travel through the earth and reflect from subterranean formations back to a plurality of geophones or seismometers on the earth's surface. The geophones or seismometers in combination with other seismographic equipment produce electric waves which are processed and recorded in a manner permitting determination of the depth and dip of the seismic wave reflecting horizons.

In other similar seismic exploration processes, explosive materials are placed beneath the surface of the earth and detonated in order to generate seismic waves therein. For example, U.S. Pat. No. 3,702,635 issued Nov. 14, 1972 to Farr discloses seismic exploration in soft areas, such as marshes, swamps, water or other unstable terrain wherein a liquid explosive is placed beneath the surface and remotely detonated to produce seismic waves therein. U.S. Pat. No. 2,353,484 issued on July 11, 1944 to Merten et al. discloses the use of explosive gas mixtures, e.g., acetylene and oxygen, in geophysical exploration wherein the gas mixture is forced into a subterranean cavity or formation and then detonated to generate seismic waves in the earth. Examples of other patents which disclose seismic exploration processes wherein explosive gases are injected beneath the surface of the earth and then detonated by mechanical means such as spark ignitors to generate seismic waves are U.S. Pat. No. 4,026,382 issued May 31, 1977 to Field et al. and U.S. Pat. No. 3,752,256 issued Aug. 14, 1973 to Mollere.

By the present invention methods are provided for detecting the presence of hydrocarbon accumulations in subterranean formations penetrated by well bores and simultaneously generating seismic waves from within the formations which travel through the earth and which are detected using known seismographic apparatus to determine the extent of the formations containing the hydrocarbon accumulations. In addition, in formations containing liquid hydrocarbon accumulations, the methods of the present invention can be utilized to determine the locations of the upper and lower extremities of the accumulations.

SUMMARY OF THE INVENTION

A method of detecting the presence and extent of a hydrocarbon accumulation in a subterranean formation comprising introducing a first gas into the formation having the property of being substantially unreactive with the formation and with water contained therein but forming a combustible mixture with hydrocarbons, introducting a second gas into the formation having the property of being substantially unreactive with the formation and with water contained therein but being explosively reactive with the first gas when mixed therewith in the presence of hydrocarbons whereby said second gas is mixed with the first gas in the formation and when in the presence of hydrocarbons explodes therein thereby generating seismic waves which travel through the earth, and detecting the seismic waves to thereby determine the presence and extent of the hydrocarbon accumulation in the formation.

It is, therefore, a general object of the present invention to provide methods of detecting the presence and extent of hydrocarbon accumulations in subterranean formations.

A further object of the present invention is the provision of methods of detecting the presence of hydrocarbon accumulations in subterranean formations penetrated by well bores and simultaneously generating seismic waves in the earth emanating from the formations which can be used to determine the configuration of the formations and the extent of the hydrocarbon accumulations therein.

Yet a further object of the present invention is the provision of methods for detecting the presence of hydrocarbon accumulations in formations penetrated by well bores, for determining if the hydrocarbon accumulations contain liquid hydrocarbons and for determining the locations of the upper and lower extremities of the liquid hydrocarbons.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figures 1, 2:
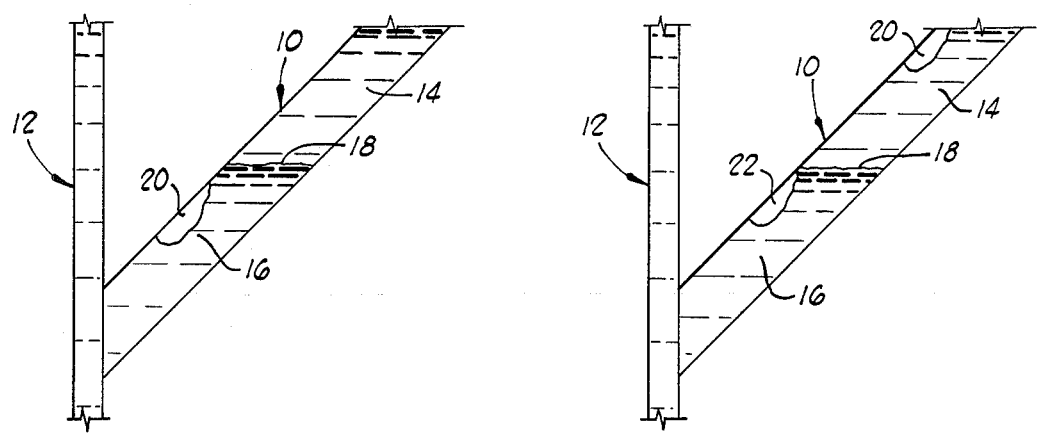
FIG. 1 is a schematic illustration of a subterranean formation penetrated by a well bore having a liquid hydrocarbon accumulation therein and having a quantity of a first gas introduced into the formation.
FIG. 2 illustrates the well bore and subterranean formation of FIG. 1 after the quantity of first gas has migrated to the upper portion of the formation and a quantity of a second gas has been introduced therein.

Referring now to the drawings and particularly to FIG. 1, a subterranean permeable strata or formation 10 is schematically illustrated penetrated by a well bore 12. The formation 10 contains a liquid hydrocarbon accumulation 14 at the upper portion thereof and a water or other aqueous fluid accumulation 16 at the lower portion thereof as well as in the well bore 12. The hydrocarbon accumulation 14 and aqueous fluid accumulation 16 are in contact at an interface 18.

By the method of the present invention for determining the presence and extent of the hydrocarbon accumulation 14, a quantity of a first gas or gas mixture 20 is introduced into the formation 10 by way of the well bore 12 using conventional techniques. The first gas or gas mixture has the property of being stable at the temperature of the formation 10 and the fluids contained therein and is substantially unreactive with the formation and water contained therein, forms a combustible mixture with hydrocarbons and is explosively reactive with a second gas or gas mixture in the presence of hydrocarbons.

Figures 3, 4:
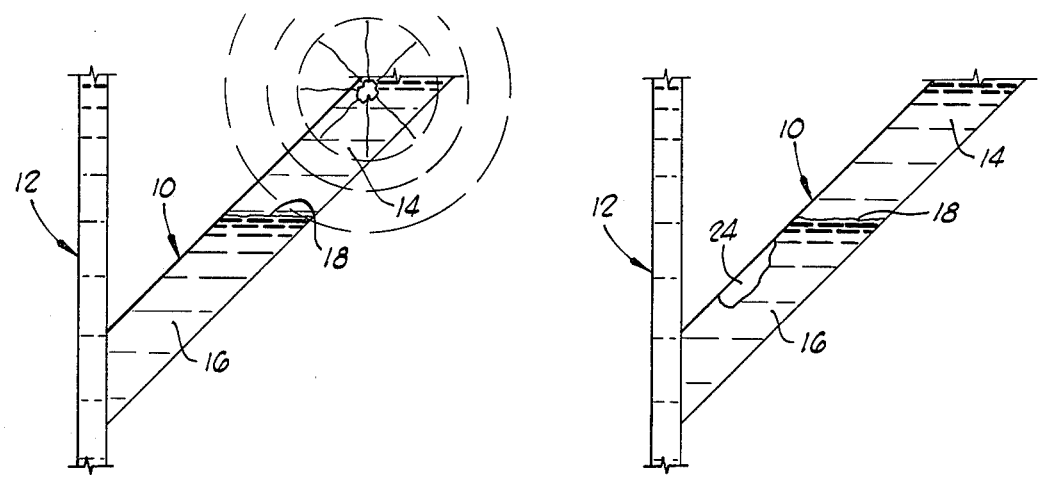
FIG. 3 illustrates the well bore and subterranean formation of FIG. 1 after the quantity of second gas has migrated to the location of the quantity of the first gas, mixed therewith in the presence of hydrocarbons and exploded.
FIG. 4 illustrates the well bore and subterranean formation of FIG. 1 after a mixture of the first and second gases has been introduced therein.

As shown in FIG. 2, after the first gas or gas mixture 20 has had time to migrate up-dip in the formation 10 through the fluids contained therein to the top portion of the liquid hydrocarbon accumulation 14, a quantity of a second gas or gas mixture 22 is introduced into the formation 10 by way of the well bore 12. The second gas or gas mixture 22 has the property of being stable at the temperature of the formation 10 and the fluids contained therein, is substantially unreactive with the formation and with water contained therein, but is explosively reactive with the first gas or gas mixture 20 when it contacts or mixes therewith in the presence of hydrocarbons. That is, when the second gas contacts a mixture of the first gas and hydrocarbons, the gases autoignite and explode. Thus, as shown in FIG. 3, after an additional period of time, the second gas or gas mixture 22 migrates up-dip through the formation 10 to the location of the mixture of first gas and hydrocarbons 20 whereupon the gases 20 and 22 mix in the presence of hydrocarbons. Upon the mixture of the gases in the presence of hydrocarbons, the gases autoignite and explode. The explosion of the gases in the formation 10 generates seismic waves which travel through the earth to the surface thereo and are recorded by seismographic equipment at the surface in a known manner. Thus, the explosion of the quantities of first and second gases introduced in the formation 10 is a positive indication that the formation 10 contains a hydrocarbon accumulation. In addition, the detection of the seismic waves produced by the explosion generates data which is used to determine the configuration of the formation 10 and the depth of the explosion from the surface of the earth.

Figure 5:
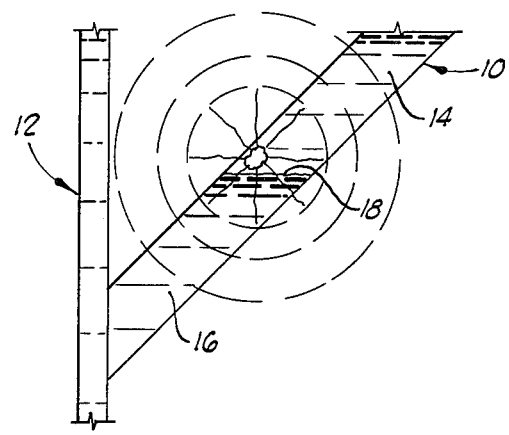
FIG. 5 illustrates the well bore and subterranean formation of FIG. 1 after the mixture of first and second gases has migrated to the hydrocarbon accumulation in the formation and exploded.

In order to determine the state of the hydrocarbon accumulation 14 in the formation 10, i.e., whether the accumulation is in the liquid or gaseous state, a mixture 24 of the first and second explosive gases or gas mixtures is next introduced into the formation 10 as shown in FIG. 4. Because the mixture of explosive gases 24 will autoignite when it reaches and mixes with hydrocarbons, when the mixture 24 migrates through the formation 10 past the interface 18 between the aqueous fluid accumulation 16 and the hydrocarbon accumulation 14 therein whereby hydrocarbons are mixed therewith, the gas mixture 24 autoignites and explodes as illustrated in FIG. 5. The seismic waves produced in the earth by the explosion of the gas mixture 24 are detected by the seismographic equipment at the surface and the depth of the explosion from the surface is determined therefrom. A comparison of the depths of the two explosions indicates whether the hydrocarbon accumulation in the formation 10 is liquid or gaseous. That is, if the two explosions are at different depths, a positive indication is given that the hydrocarbon accumulation is liquid in that a migration of the explosive gases 20 and 22 through the liquid is shown. On the other hand, if the two explosions are determined to be at substantially the same depths, the hydrocarbon accumulation is shown to be at least partially in the gaseous state.

With the seismographic data generated by the reception and recordation of the seismic waves produced by the explosions, a variety of additional information concerning the configuration of the subterranean formation 10 and the hydrocarbon accumulation therein can be determined by those skilled in the art. Such information can be used, for example, to determine if additional well bores should be drilled into the formation to achieve maximum hydrocarbon recovery.

As mentioned above, the first and second explosive gases utilized in accordance with the methods of this invention must be stable at the temperature of the formation and fluids contained therein into which the gases are introduced, i.e., the gases must not autoignite at such temperatures. In addition, the gases must be substantially unreactive with solid materials contained in the formation as well as aqueous fluids contained therein. Finally, the first and second gases must autoignite only when mixed together in the presence of hydrocarbons. Examples of first and asecond gases having these properties are phosphine and ozone.

While the methods of the present invention can be utilized for determining the presence and extent of hydrocarbon accumulations in formations of various configurations, the methods are particularly suitable for determining the extent of hydrocarbon accumulations in up-dip strata penetrated by a well bore at a down-dip location.

The specific seismographic equipment and geophone layouts or arrangements which can be utilized for detecting, processing and recording the seismic waves produced in accordance with this invention have not been described herein in detail in that they are well known to those skilled in the art as is the interpretation of the recorded data therefrom.

I claim:

1. A method of detecting the presence and extent of a hydrocarbon accumulation in a subterranean formation comprising the steps of:

introducing a first gas into said formation having the property of being substantially unreactive with said formation and with water contained therein but forming an explosive mixture with hydrocarbons contained therein;

introducing a second gas into said formation having the property of being substantially unreactive with said formation and with water contained therein, but being explosively reactive with said first gas when in contact with a mixture of said first gas and hydrocarbons whereby said second gas contacts said first gas in said formation when mixed with hydrocarbons, said gas mixture autoignites and explodes thereby generating seismic waves which travel through the earth; and detecting said seismic waves to thereby determine the presence and extent of a hydrocarbon accumulation in said subterranean formation.

2. The method of claim 1 wherein said first gas is ozone.

3. The method of claim 2 wherein said second gas is phosphine.

4. A method of detecting the extent of a liquid hydrocarbon accumulation in a subterranean formation comprising the steps of:

introducing a first gas into said formation having the property of being substantially unreactive with said formation and with water contained therein but forming an explosive mixture with hydrocarbons whereby said first gas migrates in said formation through said liquid hydrocarbon accumulation therein to the upper portion of said accumulation and mixes with hydrocarbons;

introducing a second gas into said formation having the property of being substantially unreactive with said formation and with water contained therein, but being explosively reactive with said first gas when said first gas is mixed with hydrocarbons whereby said second gas migrates through said accumulation to the location of said first gas and hydrocarbon mixture, contacts said mixture and explodes thereby generating seismic waves which travel through the earth;

detecting said seismic waves to thereby determine the location of said upper portion of said liquid hydrocarbon accumulation;

subsequently introducing a mixture of said first and second gases into said formation whereby when said mixture reaches a lower portion of said liquid hydrocarbon accumulation, said mixture mixes with hydrocarbons and explodes thereby generating seismic waves which travel through the earth; and detecting said seismic waves to thereby determine the location of said lower portion of said liquid hydrocarbon accumulation.

5. The method of claim 4 wherein said first gas is ozone.

6. The method of claim 5 wherein said second gas is phosphine.

* * * * *